(12) United States Patent
Wickham

(10) Patent No.: US 9,080,816 B2
(45) Date of Patent: Jul. 14, 2015

(54) EXHAUST RECOVERY HEAT EXCHANGER WITH INLET DAMPER

(75) Inventor: Mark Wickham, Birmingham West Midlands (GB)

(73) Assignee: HEAT RECOVERY SOLUTIONS LIMITED, London (GB)

( * ) Notice: Subject to any disclaimer, the term of this patent is extended or adjusted under 35 U.S.C. 154(b) by 990 days.

(21) Appl. No.: 13/056,254

(22) PCT Filed: Jul. 30, 2009

(86) PCT No.: PCT/GB2009/050946
§ 371 (c)(1),
(2), (4) Date: Mar. 10, 2011

(87) PCT Pub. No.: WO2010/013053
PCT Pub. Date: Feb. 4, 2010

(65) Prior Publication Data
US 2011/0180234 A1    Jul. 28, 2011

(30) Foreign Application Priority Data

Jul. 30, 2008  (GB) .................................... 0813938.8
Dec. 11, 2008  (GB) .................................... 0822584.9

(51) Int. Cl.
*F28F 27/02*  (2006.01)
*A62B 9/02*  (2006.01)
(Continued)

(52) U.S. Cl.
CPC ................ *F28D 7/106* (2013.01); *F28F 27/02* (2013.01); *F28D 21/0003* (2013.01); *F28D 2021/0082* (2013.01); *F28F 2250/06* (2013.01); *F28F 2265/10* (2013.01)

(58) Field of Classification Search
CPC ..... F28F 27/0006; F28F 27/02; F24F 11/027; B60H 1/025
USPC ........ 165/103, 100; 137/247.29, 248, 601.08, 137/601.05, 601.09, 601.11, 601.04; 251/205, 212, 298
See application file for complete search history.

(56) References Cited

U.S. PATENT DOCUMENTS 1,979,865 A * 11/1934 Chadwick et al. ........ 126/285 R
2,324,606 A *  7/1943 Wagner ..................... 73/861.81
(Continued)

FOREIGN PATENT DOCUMENTS

CN    1179185 C       12/2004
EP    1923545 A2 *    5/2008
WO    2007084011      7/2007

OTHER PUBLICATIONS

English Translation of EP 1923545 A2.*
(Continued)

*Primary Examiner* — Allen Flanigan
*Assistant Examiner* — Claire Rojohn, III
(74) *Attorney, Agent, or Firm* — Fox Rothschild LLP

(57) ABSTRACT

A heat exchange unit (100) for hot gas recovery includes an inlet duct (34) in which a heat exchange duct (59) and a bypass duct (58) are connected, one being surrounded by the other, a heat exchange array (2) situated within the heat exchange duct (59) and a damper (50) arranged to direct the flow of gas through the unit (100), such that the damper (50) is situated within the inlet duct (34) and has two extreme positions, such that in a first extreme position the damper provides a first continuous surface and substantially seals one of the heat exchange and bypass ducts from the inlet duct and in the other extreme position the damper provides a second continuous surface and substantially seals the other of the ducts from the inlet duct.

23 Claims, 13 Drawing Sheets

(51) Int. Cl.
  *F16K 31/00* (2006.01)
  *F16K 1/16* (2006.01)
  *F28D 7/10* (2006.01)
  *F28D 21/00* (2006.01)

(56) References Cited

U.S. PATENT DOCUMENTS

| | | | | |
|---|---|---|---|---|
| 2,393,170 A * | 1/1946 | Kinney et al. | | 138/37 |
| 2,692,761 A * | 10/1954 | Waitkns | | 165/7 |
| 2,833,513 A * | 5/1958 | Castera | | 251/298 |
| 2,877,860 A * | 3/1959 | Hoffar | | 181/246 |
| 3,068,892 A * | 12/1962 | Panning et al. | | 137/499 |
| 3,076,469 A * | 2/1963 | Averill | | 137/74 |
| 3,246,633 A * | 4/1966 | Csathy | | 122/7 R |
| 3,768,729 A * | 10/1973 | Dean, Jr. | | 236/13 |
| 4,313,428 A * | 2/1982 | Goldenberg | | 126/591 |
| 4,482,009 A * | 11/1984 | Nishimura et al. | | 165/203 |
| 4,498,524 A * | 2/1985 | Jacobsen | | 165/292 |
| 4,522,256 A * | 6/1985 | Wolfseder | | 165/103 |
| 4,532,961 A * | 8/1985 | Walton et al. | | 137/625.31 |
| 4,747,748 A * | 5/1988 | Sahlberg | | 415/47 |
| 4,813,649 A * | 3/1989 | Takeda et al. | | 251/315.05 |
| 5,163,829 A * | 11/1992 | Wildenberg | | 431/5 |
| 5,379,800 A * | 1/1995 | Mansfield | | 137/875 |
| 5,737,937 A * | 4/1998 | Akazawa | | 62/303 |
| 6,010,113 A * | 1/2000 | Rotering | | 251/212 |
| 6,102,103 A * | 8/2000 | Zobel et al. | | 165/10 |
| 6,116,264 A * | 9/2000 | Bachmann et al. | | 137/240 |
| 6,151,891 A * | 11/2000 | Bennett | | 60/298 |
| 6,302,191 B1 * | 10/2001 | Wickham et al. | | 165/103 |
| 6,330,910 B1 * | 12/2001 | Bennett | | 165/297 |
| 6,955,213 B2 * | 10/2005 | Stonehouse et al. | | 165/103 |
| 7,011,292 B1 * | 3/2006 | Hill | | 251/212 |
| 7,264,040 B2 * | 9/2007 | Bush et al. | | 165/103 |
| 7,546,868 B2 * | 6/2009 | Klein et al. | | 165/203 |
| 7,836,868 B2 * | 11/2010 | Gonzalez et al. | | 123/568.12 |
| 8,297,049 B2 * | 10/2012 | Ohtani | | 60/317 |
| 2003/0111211 A1 * | 6/2003 | Stonehouse et al. | | 165/103 |
| 2004/0107943 A1 * | 6/2004 | Alder et al. | | 123/456 |
| 2005/0133202 A1 * | 6/2005 | Jorgensen et al. | | 165/103 |
| 2005/0217667 A1 * | 10/2005 | Dhuper et al. | | 128/200.23 |
| 2008/0120019 A1 * | 5/2008 | Inoue et al. | | 701/113 |
| 2010/0025609 A1 * | 2/2010 | Pubben et al. | | 251/213 |
| 2013/0139492 A1 * | 6/2013 | Wickham | | 60/320 |
| 2014/0076292 A1 * | 3/2014 | Gaiser et al. | | 123/568.12 |
| 2014/0076293 A1 * | 3/2014 | Gaiser et al. | | 123/568.12 |

OTHER PUBLICATIONS

International Search Report issued for PCT/GB2009/050946 dated Feb. 19, 2010 (5 pages).
First Office Action issued Jun. 25, 2012 in Chinese Patent Appln. No. 200980138150.6 and English translation (16 pages).
Second Office Action issued Feb. 6, 2013 in Chinese Patent Appln. No. 200980138150.6 and English translation (8 pages).
Third Office Action issued Jul. 1, 2013 in Chinese Patent Appln. No. 200980138150.6 and English translation (7 pages).
Fourth Office Action issued Jan. 6, 2014 in Chinese Patent Appln. No. 200980138150.6 and English translation (7 pages).
European Search Report issued Oct. 19, 2011 in European Patent Appln. No. 09785420.2 (4 pages).
European Search Report issued Jul. 26, 2012 in European Patent Appln. No. 09785420.2 (4 pages).
Office Action for Australian Application No. 2009275670.

\* cited by examiner

EXHAUST RECOVERY HEAT EXCHANGER WITH INLET DAMPER

CROSS-REFERENCE TO RELATED APPLICATIONS

This application is the 35 U.S.C. §371 National Phase Application of International Application Serial No. PCT/GB09/050946 filed Jul. 30, 2009, which claims prioirity of GB Application No. 0813938.8 filed Jul. 30, 2008 and GB Application No. 0822584.9 filed Dec. 11, 2008, the disclosures of both are incorporated herein by reference.

FIELD OF THE INVENTION

This invention relates to heat exchangers. In particular, it relates to heat exchangers having internal bypass arrangements which may be actuated to control the bypass of hot fluid, generally a gas, around a heat exchanger array and to direct fluid flow into a by-pass circuit. In particular, but not exclusively, it relates to heat exchangers associated with gas turbines and gas/diesel engines for extracting heat from their exhaust gases. In particular the invention may relate to the field of industrial plant.

BACKGROUND OF THE INVENTION

Heat exchangers of the type used to recover heat from gas turbine or gas/diesel engine exhaust gas are commonly designed with a bypass circuit situated external to the heat exchanger array and its casing, with the exhaust gas flow to the heat exchanger array circuit and the bypass circuit controlled by at least one flap valve or the like, such valves being known as dampers.

DE 42 07 667 shows a heat exchange unit having a damper in the form of a sleeve valve axially slideable within a casing to open or close the entry to a duct containing a heat exchanger. When the sleeve valve closes the heat exchanger, exhaust gas bypasses the heat exchanger and passes exclusively through the sleeve. However, when the sleeve valve opens the duct, the exhaust gas passes through both the duct and the sleeve.

WO99/64806 also shows a heat exchange unit having a damper in the form of a slideable sleeve. However, the damper is arranged such that, at extreme positions thereof, exhaust gas can be selectively arranged to flow either through a bypass containing a heat exchanger or through a duct bypassing the heat exchanger. However, turbulence at downstream portion of the bypass duct can cause the gas to heat the heat exchanger even though gas is being diverted past the heat exchanger. Moreover, when the gas is being passed into the heat exchanger, the angle through which the gas is caused to move can create a significant pressure drop which can lead to an increased back pressure within the heat exchange unit. The skilled person will appreciate that if the back-pressure becomes too large then an engine feeding the heat exchange unit may not be as efficient as desired. Also, the particular arrangement of the damper means that the damper cannot be tested until the whole unit is assembled which can add to the time to manufacture the unit.

Another damper arrangement is provided in EP1923545A2, where the substantially rigid component surfaces of the damper are triangular in order that they may selectively mesh to seal the bypass duct and separate to seal the heat exchange duct. The disadvantage with this system is that for this damper to work the fluid must flow through triangular holes in the inlet duct to enter the heat exchange duct. The remaining casing surrounding the triangular holes therefore impedes the flow of gas to the heat exchanger even when the damper is positioned to allow gas to enter the heat exchanger.

SUMMARY OF THE INVENTION

According to a first aspect of the invention there is provided a heat exchange unit for heat recovery from hot gas comprising, an inlet duct to which an annular heat exchange duct and an annular bypass duct are connected, one being surrounded by the other, a heat exchange array situated within the heat exchange duct, a central core around which the inner of the bypass and heat exchange ducts is provided and a damper arranged to direct the flow of gas through the unit, such that the damper is situated within the inlet duct and has two extreme positions, such that in a first extreme position the damper substantially seals one of the heat exchange and bypass ducts from the inlet duct and in the other extreme position the damper substantially seals the other of the ducts from the inlet duct.

Such an arrangement is thought to be convenient as it provides a straighter path for fluid flowing therethrough. As such, there is likely to be less of a pressure drop within the gas flow. Heat exchange units are generally specified with a maximum pressure drop across the whole unit and as there is a reduced pressure drop through the damper more pressure drop can be used in the design of the heat exchange array, therefore beneficially reducing the size, weight and cost of the heat exchange array. Additionally the provision of the central core may aid fluid flow, thus reducing back pressure and/or promoting silencing of the fluid flow. The central core may in particular split the fluid flow, directing it so as to impinge on the damper in a more uniform and less turbulent way. It may be that an end region of the central core, on which fluid entering the unit impinges, is hemi-spherically shaped. This may be particularly suitable for advantageously splitting the fluid flow.

According to a second aspect of the invention there is provided a heat exchange unit for heat recovery from hot gas comprising, an inlet duct to which an annular heat exchange duct and an annular bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper substantially seals one of the heat exchange and bypass ducts from the inlet duct and in the other extreme position the damper substantially seals the other of the ducts from the inlet duct, and where further the inlet duct has substantially the same cross-sectional shape as at least one of the heat exchange duct and the bypass duct.

Such an arrangement is thought to be convenient as it provides a straighter path for fluid flowing therethrough. As such, there is likely to be less of a pressure drop within the gas flow. Heat exchange units are generally specified with a maximum pressure drop across the whole unit and as there is a reduced pressure drop through the damper more pressure drop can be used in the design of the heat exchange array, therefore beneficially reducing the size, weight and cost of the heat exchange array. Additionally consistency in cross-sectional shape of the inlet duct and at least one of the heat exchange duct and the bypass duct is thought to cause lower back pressure and help produce good fluid flow characteristics.

According to a third aspect of the invention there is provided a heat exchange unit for hot gas recovery comprising, an inlet duct to which a heat exchange duct and a bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper provides a first continuous surface and substantially seals one of the heat exchange and bypass ducts from the inlet duct and in the other extreme position the damper provides a second continuous surface and substantially seals the other of the ducts from the inlet duct.

Such an arrangement is believed to be advantageous since it provides less flow resistance to fluid input to the unit in each of the positions of the damper when compared to the prior art. Fluid entering the unit can flow into each of the heat exchange and bypass ducts across substantially the full cross section of each of those ducts.

It may be that the damper is arranged such that when sealing one of the heat exchange duct and the bypass duct it causes substantially no impediment to fluid flow to the non-sealed duct. This may be advantageous in that a lower back pressure may be present and fluid flow characteristics may be improved.

This may be achieved by the provision of a damper which comprises a damper surface, conveniently supported by a plurality of shafts, a continuous sheet member (conveniently provided by a single sheet but alternatively provided by multiple attached sheets), where the sheet member(s) is corrugated to form a bellows that can deflect without undue stresses when the shafts are moved to different positions. The damper arrangement described may be flexible due to its corrugations, and so its shape may be altered as required to efficiently seal one of the heat exchange duct and the bypass duct.

It may alternatively be that the damper comprises a plurality of sheet members conveniently supported by a plurality of shafts, the sheet members being arranged in a louver. Some of the sheets may be oriented substantially perpendicular to the others. The shafts may be selectively actuated to seal by means of the plurality of sheet members either the heat exchange duct or the bypass duct. The louver arrangement may be advantageous as it may require substantially less space to operate (particularly along the longitudinal axial length through the heat exchanger) and may weigh substantially less when compared to alternative systems such as the damper based on the corrugated sheet member already discussed. This is relevant in certain applications where low weight and a low centre of gravity for the heat exchanger may be advantageous. This is especially true when the heat exchanger is to be used in potentially rough seas on a rig. Here not only does removing weight and lowering the centre of gravity reduce the cost and increase the stability of the heat exchanger, it also has the same effect on the rig, where consequently less supporting structural material will be required.

It may be that the damper has two ducts, one being surrounded by the other, that align with the heat exchange duct and the bypass duct. This may effectively extend the lengths of the heat exchange duct and the bypass duct, and may be a convenient way of sealing and opening only one of the ducts at a time.

It may be that each shaft supports at least two sheet members that are oriented perpendicular to one another. This may allow for simultaneous sealing of one duct and opening of the other, such that fluid flow is prevented through one duct and allowed through the other. Additionally it may allow for degrees of sealing and opening to occur between the extremes of sealed and open. Alternatively it may be that two sheet members supported by a shaft may be oriented at an angle other the 90° to one another, where it is not desirable to completely close one duct while another is open.

It may be that substantially perpendicularly orientated sheet members supported by the same shaft are in separate ducts and that both ducts have only substantially parallel oriented sheet members. Substantially perpendicular sheet members in different ducts may mean that when one duct is sealed the sheet members will provide substantially no impediment to the flow of fluid in the other duct.

It may be that the shafts pass through the ducts to which they are attached by bearings. It may be that the shafts are selectively actuated by rotating their protruding outer ends. This may provide a convenient way of actuating the sheet members.

It may be that the shafts are actuated in unison and that when they are actuated the parallel oriented sheet members in each duct are rotated by the shafts into or out of operative engagement so as to seal one of the heat exchange duct and the bypass duct, and to open the other one.

It may be that each sheet member has one or more ledges at edge regions thereof. It may be that each sheet member has continuous ledges around its perimeter on both its top and bottom surface. The ledges may be advantageous as they may help to create a more effective seal when the sheet members are oriented so as to seal one of the ducts. Ledges on the edge regions of the sheet members may cooperate to seal neighbouring sheet members, while ledges at the ends of the sheet members may seal each sheet member against the duct walls. The ledges may be provided with a sealing material, the material preferably having high elasticity at the operating temperatures of the damper (such as Inconel 625 or Hastoloy).

According to a fourth aspect of the invention there is provided a heat exchange unit for heat recovery from hot gas comprising, an inlet duct to which an annular heat exchange duct and an annular bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper substantially seals one of the heat exchange and bypass ducts from the inlet duct and in the other extreme position the damper substantially seals the other of the ducts from the inlet duct, the damper comprising a plurality of sheet members conveniently supported by a plurality of shafts, the sheet members being arranged in a louver with sheet members provided in one of the heat exchange duct and the bypass duct being oriented substantially perpendicular to sheet members in the other of the ducts wherein the shafts are arranged to selectively actuated to seal by means of the plurality of sheet members either the heat exchange duct or the annular bypass.

According to a fifth aspect of the invention there is provided a heat exchange unit for heat recovery from hot gas comprising, an inlet duct to which an annular heat exchange duct and an annular bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper substantially seals one of the heat exchange and bypass ducts from the inlet duct and in the other extreme position the damper substantially seals the other of the ducts from the inlet duct.

Such an arrangement is thought to be convenient as it provides a straighter path for fluid flowing therethrough. As such, there is likely to be less of a pressure drop within the gas flow. Heat exchange units are generally specified with a maximum pressure drop across the whole unit and as there is a reduced pressure drop through the damper more pressure drop can be used in the design of the heat exchange array, therefore beneficially reducing the size, weight and cost of the heat exchange array.

Conveniently, the damper may comprise a frusto conical shell when in the first extreme position. Further, the damper may comprise a substantially cylindrical shell when in the second extreme position. In other embodiments, the damper may comprise a shell having any other cross section, such as oval, square, rectangular, etc. If the cross section of the unit were changed from circular, it is likely, but not essential, that the cross section of the damper may also be changed when in the second extreme position.

The damper may comprise a damper surface which is conveniently supported by a plurality of shafts. Such a damper surface may be a convenient way in which to provide a fluid tight seal.

The damper surface may be provided by a single sheet member. Alternatively, the damper surface may be provided from a plurality of sheet members.

The or each sheet members may be corrugated to form a bellows that can deflect without undue stresses when the shafts are moved to different positions. Generally the corrugations are such that the corrugations lie substantially parallel to a longitudinal axis of the unit. Such an arrangement conveniently allows the damper to move between the two extreme positions.

Conveniently, each corrugation is radiussed, as opposed to being a fold. Such an arrangement is convenient since it can help reduce stress raisers (or stress concentrations) within the damper which can help to prolong the life of the damper.

The or each sheet members may be laminated. At least one lamination may be of a thermally and/or acoustically insulating material. Such members may be advantageous through tailorable thermal or acoustic transfer properties. Conveniently, any shafts that form the damper are equi-spaced around the damper.

The unit may comprise a damper moving mechanism arranged to move the damper between the two extreme positions. The damper moving mechanism generally allows the damper to take one or more positions between the two extreme positions. In some embodiments, these positions may be discrete positions whilst in other embodiments the position of the damper may be substantially infinitely variable between the two extremes.

The mechanism may conveniently comprise a ring to which each shaft is linked. The ring may be linked to each shaft via a linkage, which comprise a rod like member.

The ring may be driven by one or more actuators.

In other embodiments, the damper may have other constructions. For example, the damper may comprise a plurality of sub-components. The sub-components of the damper may be arranged in a clam shell type arrangement, such that in the closed condition the first extreme position is provided (ie fluid flows through one of the bypass duct and the heat exchange duct) and in the open condition the second extreme position is provided (ie fluid flows through the other of the ducts).

Conveniently, the heat exchange duct and the bypass duct are concentric with one another.

In at least some embodiments, a central core may be provided around which the inner of the bypass and heat exchange ducts is provided.

An end region of the central core may provide baffle upon which fluid, entering the unit, impinges. Such a baffle may aid fluid flow and/or silencing of the fluid flow.

The central core may be arranged to provide a valve seat against which the damper seals when in the first extreme position. The valve seat may comprise an indentation in the central core.

In some embodiments an air blast may be provided to aid sealing of the damper against the central core.

An outer casing of the unit may provide a valve seat against which the damper seals when in the second extreme position. Conveniently, the outer casing comprises a step which provides the valve seat.

In one embodiment, the inner of the annular ducts provides the heat exchange duct and the outer of the annular ducts provides the bypass duct. Such an arrangement is perhaps convenient because it can help to reduce the diameter of coils used in the heat exchange array as well as providing a direct route to the heat exchange array with minimum pressure drop. The skilled person will appreciate that this has resultant advantages that the space required to handle, store and ship is reduced. Further, the size of the tools required to make the coils is also reduced thereby further reducing costs. Further, surrounding the heat exchange duct with the bypass duct increases the insulation of the heat exchange duct from the atmosphere which can help to reduce heat loss and thereby increase efficiency.

In an alternative embodiment, the inner of the annular ducts provides the bypass duct and the outer of the annular ducts provides the heat exchange duct.

The heat exchange array may comprise helically coiled tubes and/or finned tubes. However the array may take any form that can be conveniently located in the heat exchange duct, For example tubes running longitudinally from a first end region (which may be the top) to a second, distal, end region (which may be the bottom) of the heat exchange duct, with exhaust gas flowing either inside the tubes or outside the tubes, with process fluid flowing on the other side of the tubes.

According to a sixth aspect of the invention there is provided a heat exchange unit for heat recovery from hot gas comprising, a heat exchange duct and bypass duct, heat exchange array situated within the heat exchange duct and damper arranged to direct the flow of gas; wherein the bypass duct surrounds the heat exchange duct and the damper has two extreme positions, such that in a first position gas flow passes through the bypass duct and in the other extreme position gas flow passes through the heat exchange duct and thereby flows through the heat exchange array.

According to a seventh aspect of the invention there is provided a damper arranged to provide a fluid impermeable barrier which comprises a plurality of shafts wherein upon each shaft there is mounted at least two sheet members, the damper further comprising an inner duct and an outer duct, wherein at least one sheet member is provided within each of the inner and outer ducts such that each of these sheet members is mounted substantially perpendicularly to the other.

According to a eighth aspect of the invention there is provided a damper arranged to provide a fluid impermeable barrier which moves from a frusto conical arrangement when in a first extreme position to a substantially cylindrical arrangement when in a second extreme position.

The damper of the sixth or seventh aspect of the invention may be suitable for use in the heat exchange unit of any of the earlier aspects of the invention. However, in other embodiments, the damper may be used in embodiments which are not related to heat exchange. For example, such a damper may be utilised to direct flow of fluid selectively between two concentric pipes.

The dampers may have any of the features described in relation to the earlier aspects of the invention.

According to an ninth aspect of the invention there is provided a heat exchange unit for hot gas recovery comprising, an inlet duct to which a heat exchange duct and a bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper substantially seals one of the heat exchange and bypass ducts from the inlet duct and in the other extreme position the damper substantially seals the other of the ducts from the inlet duct.

According to a tenth aspect of the invention there is provided a heat exchange unit for hot gas recovery comprising an inlet duct to which a heat exchange duct and a bypass duct are connected, one being surrounded by the other, a heat exchange array situated within the heat exchange duct and a damper arranged to direct the flow of gas through the unit, such that the damper is situated within the inlet duct and has two extreme positions, such that in a first extreme position the damper substantially closes one of the heat exchange and bypass ducts whilst leaving substantially the full cross section of the other exposed and in the second extreme position substantially closes the other of the heat exchange and bypass ducts whilst leaving substantially the full cross section of the other exposed.

According to a eleventh aspect of the invention there is provided a heat exchange unit arranged to recover heat from hot gas, the unit comprising a heat exchange duct and a bypass duct which are selectively closable, and at least one of the ducts having one or more fluid intakes thereinto each of which is arranged such that when that duct is substantially closed and fluid flows through the other of the ducts, fluid is drawn through the intake(s) and into that duct.

Such an arrangement may be convenient because it can help to prevent overheating of the closed duct. As such, fluid drawn into the closed duct may thought of as a cooling fluid arranged to cool the closed duct.

In one embodiment, it is the heat exchange duct that has the or each intake positioned therein. The heat exchange duct may have positioned therein a heat exchange array arranged to remove heat from hot air passing through the array. Thus, when the heat exchange duct is closed (ie substantially no hot gas enters from an inlet duct) air may be induced to flow into the heat exchange duct from the or each intake. Such induced flow may help residual heat to be removed from the heat exchange duct and/or the heat exchange array which may prevent damage thereto.

In other embodiments it may be the bypass duct or both ducts in which the or each intakes are positioned.

There may be provided a plurality of intakes which may be provided around the or each duct. The intakes may be provided equi-spaced around the duct.

In one embodiment, there are provided six intakes around the or each duct. In other embodiments, there may be provided 1, 2, 3, 4, 5, 7, 8, 10, 20 ducts, or any number in between around the or each duct.

The or each intake may be connected via a conduit. The conduit may be arranged to supply fluid to the or each intake. The fluid may be air.

Conveniently, the or each intake and the conduit are arranged such that fluid is drawn through them by a negative pressure created within the duct into which the intakes connect. The negative pressure may be created by a Venturi effect of fluid flowing through the duct other than the duct that is closed; for example should the intakes protrude into the heat exchange duct which is substantially closed then fluid flowing through the bypass duct may be arranged to cause a negative pressure in the heat exchange duct thereby drawing fluid through the or each intake.

A flow control mechanism may be provided within the conduit and arranged to control the flow of fluid therethrough.

According to an twelfth aspect of the invention there is provided a heat exchange unit comprising a duct therethrough and being arranged to induce, using a Venturi effect, surrounding air into the duct.

It will be understood that the invention is not limited by the discussion in relation to separate aspects. Any of the features may be employed separately or in combination with any other features discussed anywhere in the specification, and the invention extends to and includes all combinations and subcombinations of one or more features described herein in any form of heat exchange system.

BRIEF DESCRIPTION OF THE DRAWINGS

There now follows by way of example only a detailed description of the present invention with reference to the accompanying drawings in which.

DETAILED DESCRIPTION OF THE DRAWINGS

The heat exchange units 100 shown in the Figures are exhaust gas heat recovery units suitable for use, e. g., in the off shore oil and gas industries. Other fields of use are equally possible and the invention is not limited to the oil and gas industries. The damper described herein may have wider applicability outside the field of heat exchange units.

Figure 1:
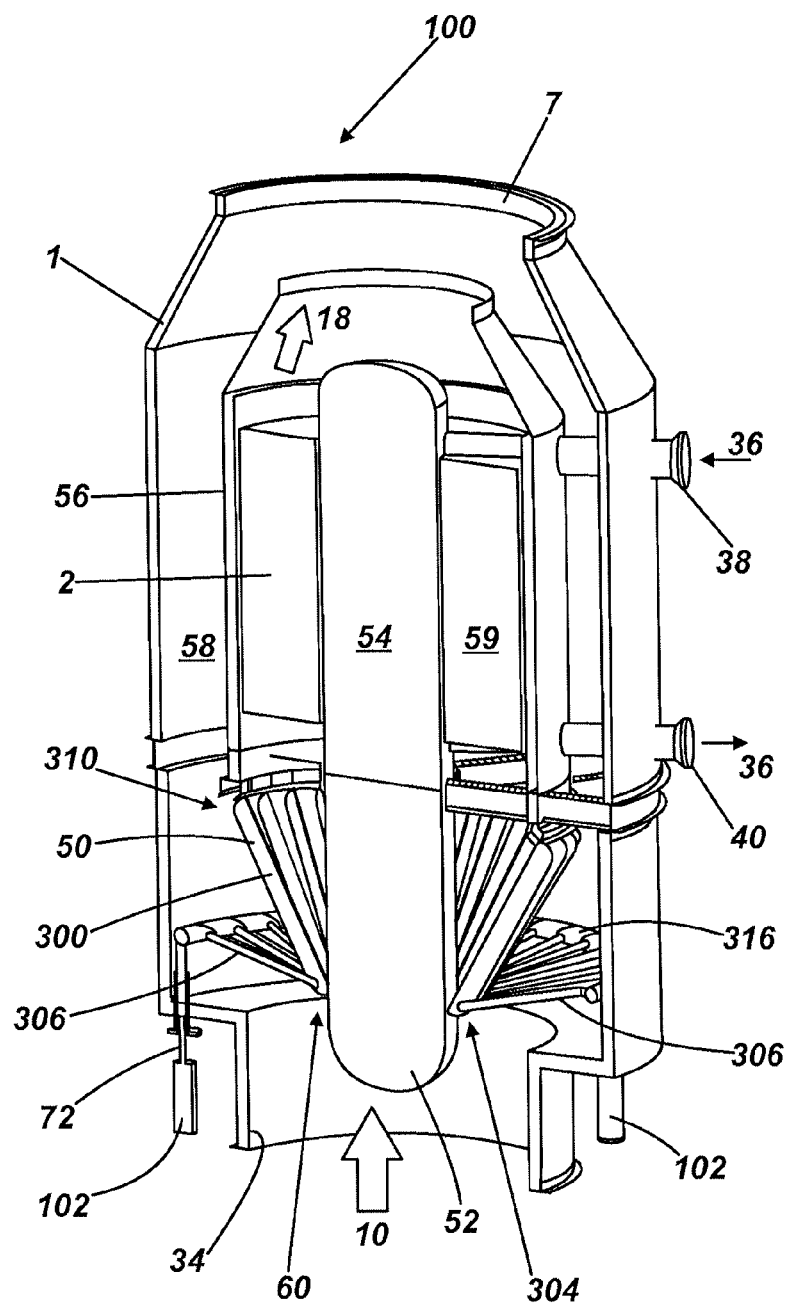
FIG. 1 shows a cross section through a heat exchanger according to one embodiment of the invention with a damper in a bypass position in a first configuration.

The units 100 are generally cylindrical in shape and are drawn with their major axes oriented vertically. As indicated in FIG. 1, such a unit is intended to receive hot gas 10 through gas inlet duct 34 from a gas turbine engine or other type of engine (not shown), cool the gas as required by heat exchange with a fluid circulating in a heat exchanger array 2, and pass the cooled gas 18 onwards for venting from the gas exit duct 7 to the atmosphere, a stack, or for further use. The heat exchange fluid 36 is passed in and out of the heat exchanger array 2 via an inlet pipe 38 and an outlet pipe 40. Generally the inlet is at the top of the heat exchange array and outlet at the bottom, however these may be reversed in certain instances and if multiple heat exchange arrays are installed in the same heat exchange duct then they may be configured differently. The heat exchange array may be used for heating process fluid such as water, thermal fluids, air, gas or for generating steam, or the like.

Figure 2:
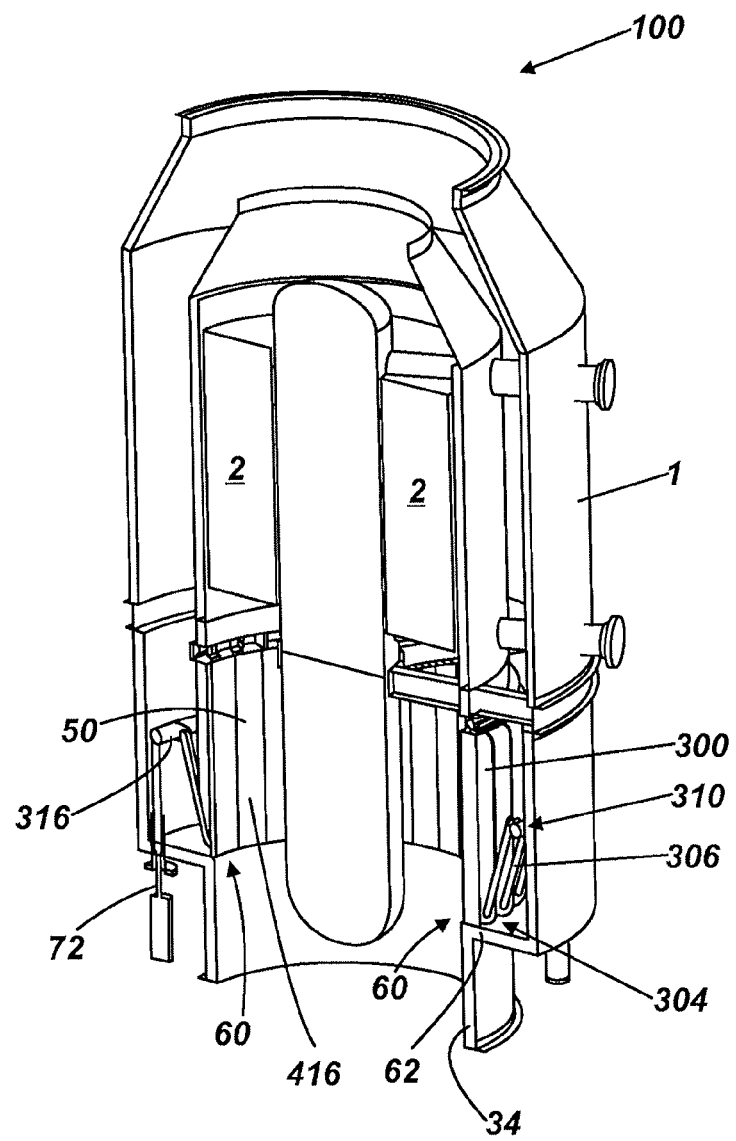
FIG. 2 shows a cross section through the heat exchanger of FIG. 1 with the damper in a heat exchange position (which may be termed an open to coil position) which provides a second, different, configuration.

Referring to FIGS. 1 and 2 together, the heat exchange unit 100 comprises a generally cylindrical outer casing or shell 1, containing an annular heat exchanger array 2, a damper 50 moveable between two extreme positions and a baffle 52 situated within the inlet duct 34.

The annular heat exchange array 2 is provided around a central core 54 which is provided at a central region of the unit, along a longitudinal axis thereof. A fluid impermeable wall 56, fabricated from a material such as sheet or plate steel (generally stainless steel for temperature resistance), is formed around the heat exchange array 2. The diameter of the wall 56 is less than that of the outer casing 1 and as such, an annular fluid passage 58, which in this embodiment may be termed a by-pass duct, is formed between the wall 56 and the outer casing 1.

Thus, two ducts are formed; the annular by-pass duct 58 between the casing 1 and the wall 56 and an annular heat exchange duct between the wall 56 and the central core 54. As such, the by-pass duct surrounds the heat exchange duct and is concentric therewith. Each of these ducts communicates with the connects to the inlet duct 34 so that fluid entering the unit can be passed through either or both of the by-pass 58 and heat exchange ducts 59.

In other embodiments, there may be no central core and as such the inner of the two ducts may be cylindrical rather than annular. Thus, in the embodiment being described, the heat exchange duct would by circular in cross-section if there were no central core.

In FIG. 1, the damper 50 is shown in its first extreme position which in the embodiment being described may be considered a bypass position in which hot gas 10 entering the unit 100 is directed, by the damper 50, to flow through the annular fluid passage 58. It will be seen that in this arrangement the damper 50 provides a frusto-cone which presents a substantially continuous surface to fluid entering the unit 100 substantially closing the heat exchange duct but leaving substantially the full cross section of the bypass duct exposed for hot gas to flow into.

As explained hereinafter, a mechanism holds an outer edge region 60 of the damper 50 against the baffle 52 which provides sufficient seal for most purposes to prevent hot gas 10 entering the heat exchange array 2. However if further sealing is required a seal such as a resilient material etc, may be provided on an indented step 500 in a bottom region of the baffle 52 to seal against the outer end of region 60.

In some embodiments an air blast system (not shown) may be provided in order to further prevent any hot gas 10 entering the heat exchange array 2 and in such embodiments, it should be possible to prevent any hot gas 10 from entering the heat exchange array 2, forming substantially a 100% seal.

In FIG. 2, the damper 50 is shown in its second extreme position which in the embodiment being described may be considered a heat exchange position in which the outer end region 60 thereof is held against the outer casing 1. In this arrangement hot gas 10 entering the unit 100 is directed to flow through the heat exchange duct and therefore through the exchange array 2. In this arrangement, it will be seen that the damper 50 also provides a substantially continuous surface which in this case is substantially cylindrical and substantially blocks the bypass passage whilst leaving substantially the full cross section of the heat exchange duct exposed for hot gas to flow therethrough. As such fluid entering the unit 100 is provided with a generally straight passage through the unit.

In the heat exchange position, the damper 50 adopts a substantially cylindrical arrangement and it will be seen that the outer casing 1 has a step 62 adjacent the inlet duct 34. As can be seen in FIG. 2, when the damper 50 is in the heat exchange position, the outer end region 60 thereof, is arranged such that the step shields the outer end region 60 from the hot gas 10 entering the inlet duct 34 and thereby the step 62 acts as a valve seat for the damper. As such, substantially all hot gas 10 is directed through the heat exchange array 2 whilst the damper 50 is in the heat exchange position. However, if further sealing is required a seal, such as a resilient material, etc. may be provided on the step 62 in order to seal against the outer end region 60. If 100% seal is required then an air blast system may be installed to prevent any exhaust gas leaking to the bypass duct.

In other embodiments, the damper 50 may take other cross sectional shapes when in the second extreme position.

Figure 3:
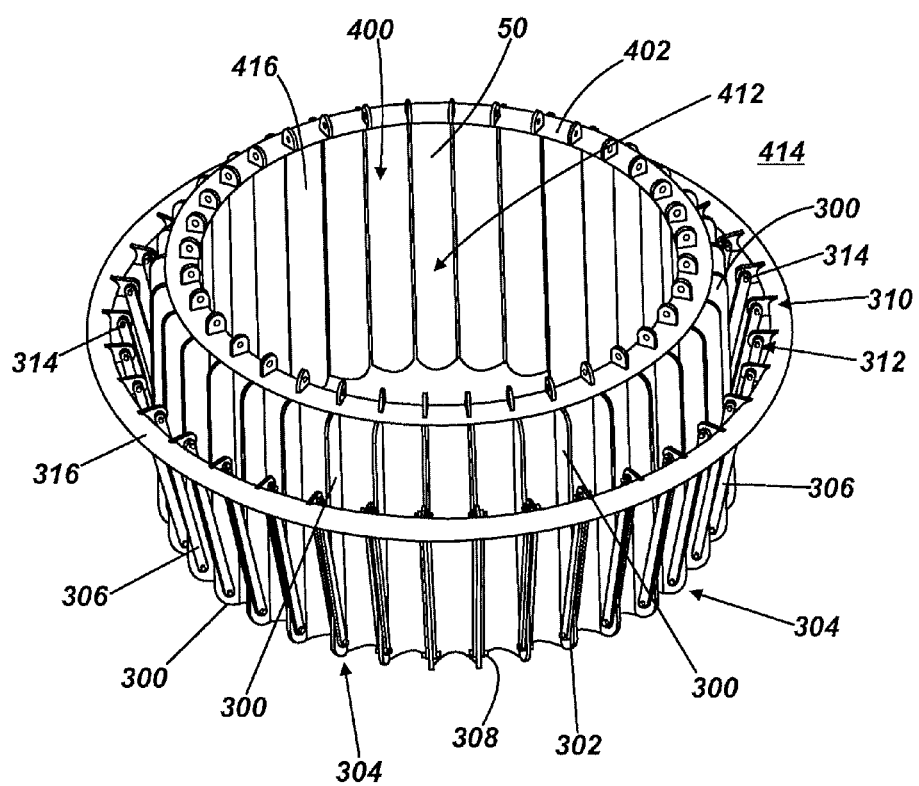
FIG. 3 shows further detail of a corrugated damper showing a push rod and ring beam mechanism that can be used to move the damper.

A damper moving mechanism is provided in order to move the damper 50 between the two extreme positions and as can be seen in FIGS. 1 and 3 beams 300 are attached, possibly by welding, adhering or the like, to each corrugation of the damper 50. Each beam 300 has a hole 302 through a lower end region 304 to which a push rod 306 is attached by a pin 308 or other means, which allows the joint to rotate. The other end, which may be referred to as an upper end region 310, of each push rod 306 has a hole 312 therethrough which is passed over a lug 314 on a concentric ring beam 316 which is mounted within the unit 100 concentrically with the casing 1. This arrangement for mounting the upper end region 310 of the push rod 306 on the ring beam 316 allows relative rotational motion between the rod 306 and the beam 316. The push rod 306 may be thought of as a linkage between each beam 300 and the ring 316.

Figure 5:
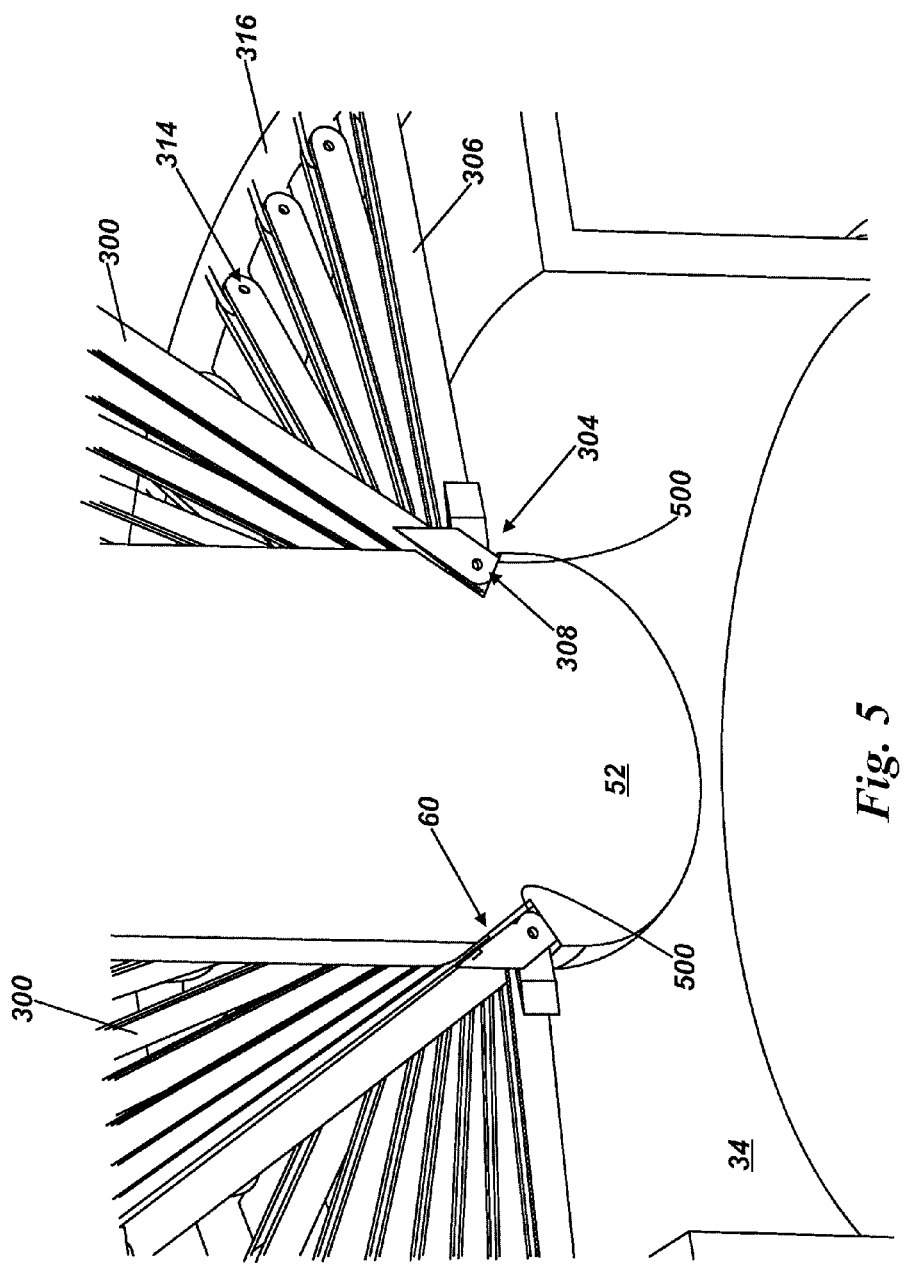
FIG. 5 shows further detail of control mechanism for the damper as shown in earlier Figures from which, for reasons of clarity, the damper has been omitted.

As can be best seen from FIG. 5, the baffle 52 comprises an indentation 500 of complimentary shape to receive the outer edge region 60 of the damper 50 which thereby provides a valve seat for the damper. Such an indentation 500 can aid sealing of the damper 50 whilst in the first configuration as shown in FIGS. 1 and 5.

The ring beam 316 is of fixed diameter, and concentric with the longitudinal axis of the unit 100, in this embodiment, the ring beam 316 is connected to three control rods 72 (one of which can be seen in the Figures) which pass out through a region of the casing adjacent the inlet duct 34 via gas seals (not shown) and in this embodiment, this is conveniently through the step 62. In other embodiments, more or less than three control rods 72 may be provided.

The distal end regions of the control rods 72, away from the damper 50, are connected to actuators 102 which are commonly hydraulic or pneumatic cylinders. However, any other suitable actuators such as electrical, or manually operated may be used.

A guide is provided on the casing within the annular fluid passage 58 for each of the control rods 72 and arranged to guide each control rod 72 during operation thereof, to help ensure the ring beam 316 can only move along the unit's 100 main longitudinal axis and remains perpendicular to that main axis.

Figure 4:
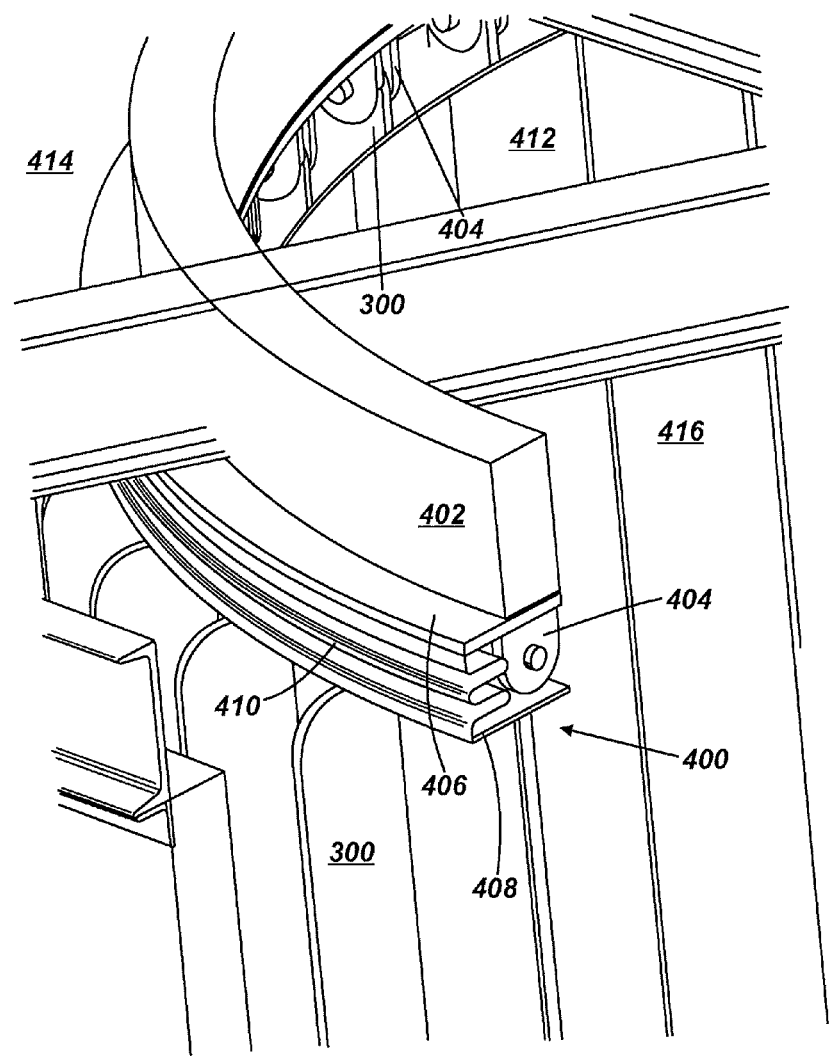
FIG. 4 shows a section of the corrugated damper of FIG. 3 with top pivot and bellows arrangement.

As can be best seen in FIGS. 3 and 4, a top end region 400 of beam 300 is pivotably mounted upon a support ring 402. As can be best seen in FIG. 4 a series of flanges 404 depend from an underside thereof. Each of these flanges 404 has pivotally connected thereto a beam 300. In particular, in the embodiment shown, two flanges 404 have sandwiched therebetween a single beam 300 although this need not be the case in other embodiments.

The support ring 402 comprises a lower flange 406 and each of the beams 300 comprises and upper flange 408 which together form a ring concentric with the unit 100. An annular bellows 410 is provided between the lower flange 406 and the ring formed by the upper flanges 408 thereby providing a fluid tight seal between a core region 412 of the damper 50 and an outer region 414 of the damper.

Mounted onto each of the beams 300 is a damper surface 416 which provides the surface that seals off either the heat exchange duct or the bypass duct depending on whether the damper 50 is in the first or second extreme position. In some embodiments the damper surface 416 is provided by a plurality of sheet members, each of which is fastened to a beam 300. In other embodiments, the damper surface 416 is provided by a single sheet which is shaped and corrugated as necessary for it to move between the bypass and heat exchange positions. Such a damper may conveniently be thought of as having the shape of a corrugated lamp shade and FIG. 4 shows this in more detail.

The baffle 52 is provided within a central region of, and axially aligned with, the gas inlet duct 34 and comprises a generally hemispherical end region concentric with the outer casing 1. The baffle 52 acts as a flow splitter and has a cylindrical upper portion which provides the central core 54.

To provide improved sound attenuation in the annular bypass fluid passage 58, the outer surface of the wall 56 and an inner surface of the outer casing 1 have a sound attenuating lining over at least part of their length.

For noise absorption within the heat exchanger array, sound attenuation linings are provided respectively on an outside of the central core 54 and on an inside of the wall 56.

The sound attenuation linings also have a temperature insulating function to reduce heat loss through the walls of the heat exchanger duct and the outer casing.

In operation, the position of the damper 50 is controlled in order that the temperature of the heat exchange fluid 36 is maintained at a desired temperature. To this end, the control rods 72 are actuated in order to control the amount of hot gas passing through the heat exchange array 2, which can vary between substantially all of the hot gas 10 entering the unit when the damper 50 is as shown in FIG. 2 to substantially none of the gas 10 when the damper 50 is as shown in FIG. 1 through any amount between these two extremes by positioning the damper 50 at intermediate positions.

Although FIGS. 1 and 2 show the damper 50 in its two extreme positions, it should of course be understood that the position of the damper is variable according to the input from the rods 72, so that intermediate positions could be adopted, thereby allowing some of the hot gas 10 to pass through the annular fluid passage 58 and some through the heat exchanger array 2.

Figure 6:
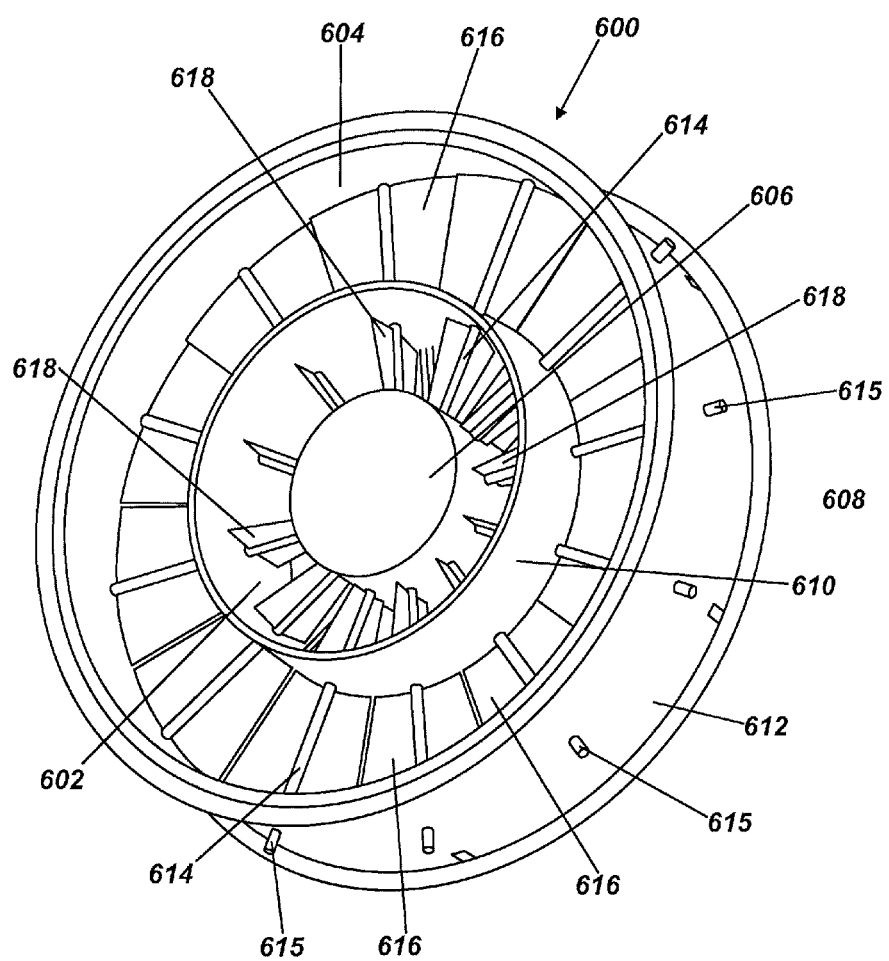
FIG. 6 is perspective view of a louver damper arrangement shown in a heat exchange position (which may be termed an open to coil position)
Figure 7:
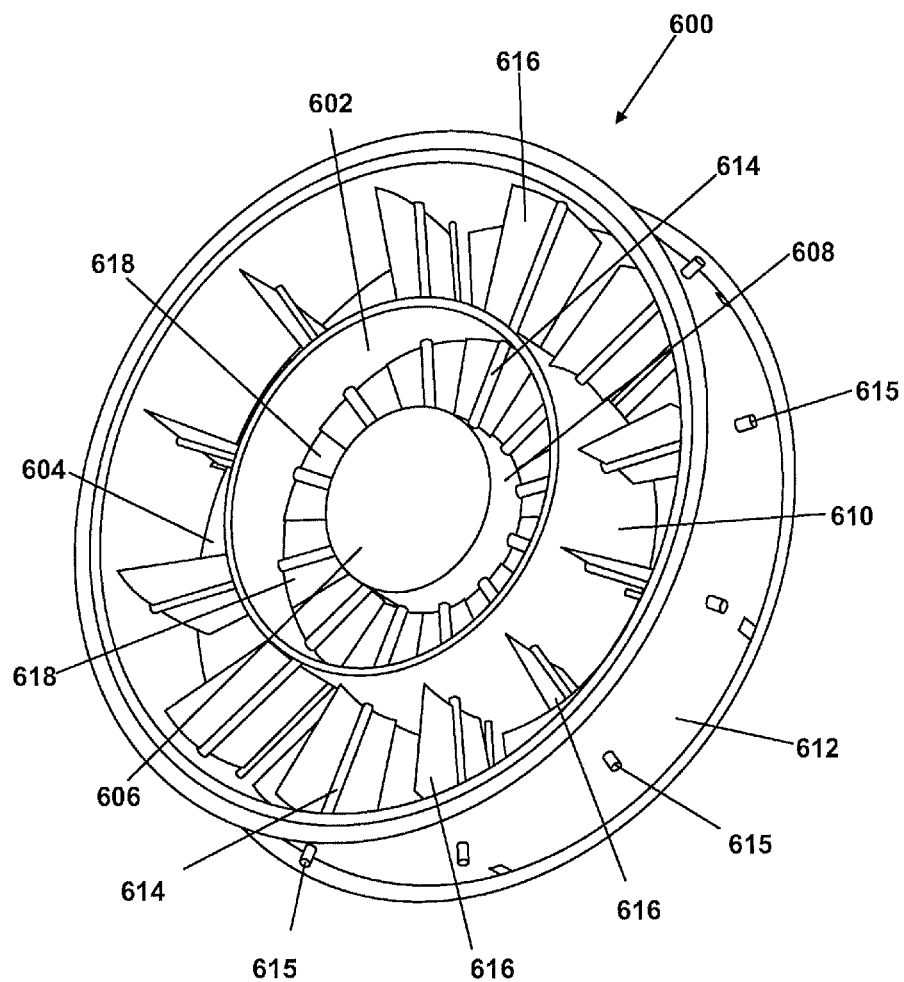
FIG. 7 shows the louver damper arrangement of FIG. 6 in the bypass position.

Referring now to FIGS. 6 and 7 an alternative damper arrangement is provided generally at 600. The damper 600 has inner 602 and outer 604 ducts, the inner 602 being surrounded by the outer 604. The inner 602 and outer 604 ducts align with the heat exchange duct (not shown) and the bypass duct (not shown) respectively of a heat exchanger 800 (shown in FIG. 8) effectively extending their lengths. At the centre of the inner duct 602 is a baffle 606. Baffle 606 is provided within a central region of, and axially aligned with, the gas inlet duct 802 and comprises a generally hemispherical end region concentric with the outer casing 804 of the heat exchanger 800. The baffle 606 acts as a flow splitter and has a cylindrical upper portion which provides a central core 608. The inner duct 602 is defined between the central core 608 and an inner duct wall 610. The outer duct 604 is defined between the inner duct wall 610 and an outer duct wall 612.

A plurality of shafts 614 are provided that extend radially through the damper 600, passing through the outer duct wall 612, through the outer duct 604, through the inner duct wall 610, through the inner duct 602 and into the central core 608. The shafts 614 are provided at regular intervals around the circumference of the damper 600. Suitable openings (not shown) are provided for the passage of the shafts 614 in the central core 608, inner duct wall 610 and outer duct wall 612. The openings (not shown) are also suitable for receiving and retaining a bearing (not shown) such as a glacier bearing. The bearings (not shown) mean that the shafts 614 may be rotated about their longitudinal axes. An extending portion 615 of each of the shafts 614 extends radially outwards beyond the outer duct wall 612. The extending portion 615 is attached to an actuation mechanism (not shown), such as a lever or the like for rotating substantially simultaneously all of the shafts 614. However, any suitable mechanism may be employed, such as a gear provided on an end region of the shaft, etc.

Attached, perhaps by welding or the like, to each shaft 614 is a pair of sheet members of stainless steel, one housed in the outer duct 604 (outer sheet member 616) and the other housed in the inner duct 602 (inner sheet member 618). The set of sheet members in each duct 602, 604 produces a louver arrangement. The outer sheet member 616 and inner sheet member 618 on each shaft 614 are welded positioned with the shaft 614 so as to be orientated substantially perpendicular to one another. The sheet members 618 in each duct (inner 602 and outer 604) are however similarly orientated.

As shown in FIG. 6, which shows a first extreme position of the damper, the outer sheet members 616 are shaped such that when the shafts 614 are rotated appropriately the outer sheet members 616 cooperate to produce a substantially continuous surface. When the shafts are so arranged, the sheet members 618 within the inner duct are oriented substantially parallel to the direction of fluid flow being substantially perpendicularly the sheets members within the outer duct. Thus, in this first extreme position the outer duct 604 is substantially sealed whereas the inner duct 602 remains open. As such, a outer duct 604 is closed by a substantially continuous surface.

As shown in FIG. 7, which shows a second extreme position of the damper, the inner sheet members 618 are shaped such that when the shafts 614 are rotated appropriately the inner sheet members 618 cooperate to produce a substantially continuous surface. When the shafts are so arranged, the sheet members 616 within the outer duct are oriented substantially parallel to the direction of fluid flow being substantially perpendicularly the sheet members within the inner duct. Thus, in this second extreme position the inner duct 602 is substantially sealed whereas the outer duct 604 remains open. In this position the inner duct 602 is sealed by a substantially continuous surface.

Although not shown here, in other embodiments the sheet members are provided with perimetrical ledges at their edges.

The ledges are attached, perhaps by welding, onto the sheet and are shaped so as to create a seal between neighbouring sheet members and between each sheet member and the central core 608 and inner duct wall 610 or the inner duct wall 610 and outer duct wall 612 as appropriate. Additionally the ledges may be provided with a sealant having high elasticity at the operating temperatures of the damper 800 (such as Inconel 625 or Hastoloy).

Figure 8:
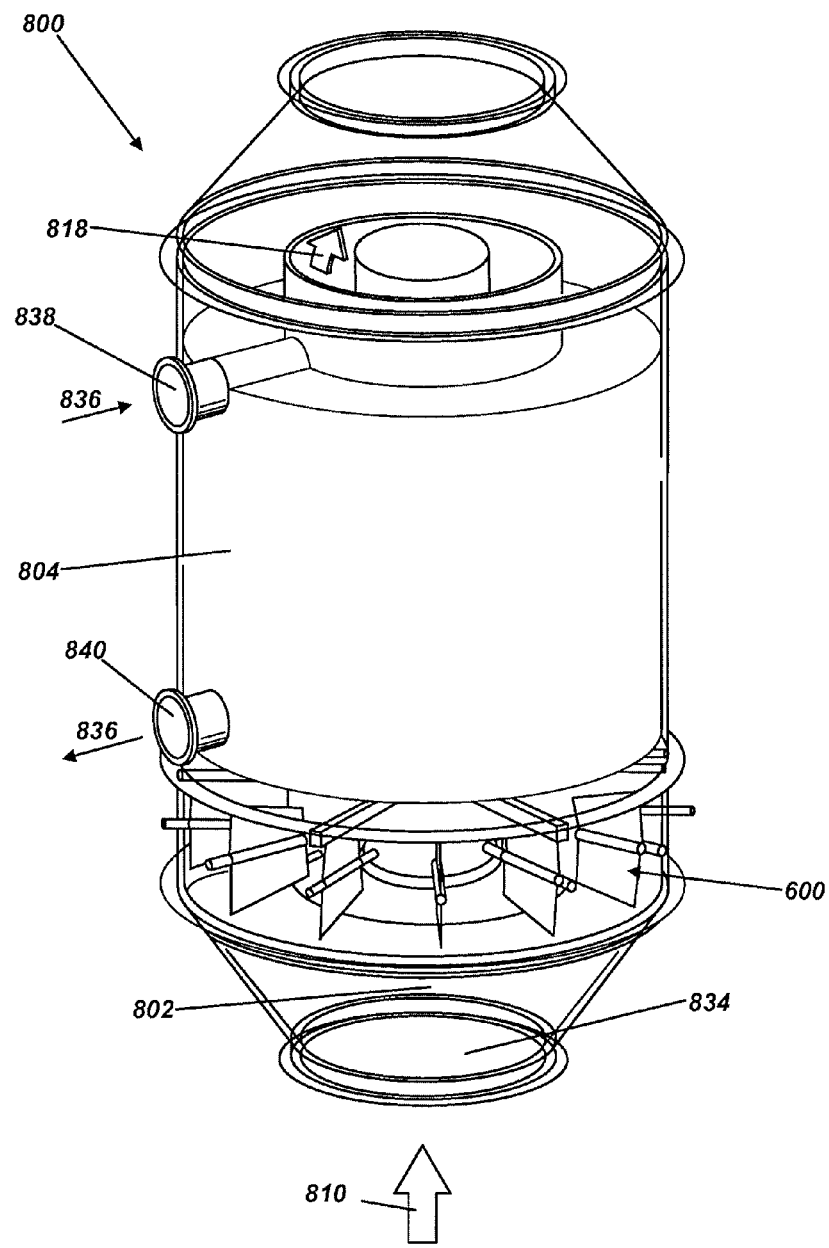
FIG. 8 shows the louver damper arrangement of FIG. 6 positioned in a heat exchanger.

Referring specifically now to FIG. 8 the heat exchanger 800 is shown. The heat exchanger is similar in design to the heat exchanger 100 of FIG. 1. The heat exchanger 800 is generally cylindrical in shape and is drawn with its major axes oriented vertically. It is intended to receive hot gas 810 through gas inlet duct 834 from a gas turbine engine or other type of engine (not shown), cool the gas as required by heat exchange with a fluid circulating in a heat exchanger array (not shown), and pass the cooled gas 818 onwards for venting from the gas exit duct 807 to the atmosphere, a stack, or for further use. The heat exchange fluid 836 is passed in and out of the heat exchanger array (not shown) via an inlet pipe 838 and an outlet pipe 840. Generally the inlet is at the top of the heat exchange array and outlet at the bottom, however these may be reversed in certain instances and if multiple heat exchange arrays are installed in the same heat exchange duct then they may be configured differently. The heat exchange array may be used for heating process fluid such as water, thermal fluids, air, gas or for generating steam, or the like. The heat exchanger 800 differs from the heat exchanger 100 in that it utilises the damper 600 in place of damper 50.

In operation, the arrangement of the damper 800 is controlled in order that the temperature of the heat exchange fluid 836 is maintained at a desired temperature. To this end, the shafts 614 are actuated via rotation of the extending portions 615, in order to control the amount of hot gas passing through the heat exchange array (not shown), which can vary between substantially all of the hot gas 810 entering the unit when the damper 600 is as shown in FIG. 6 to substantially none of the gas 810 when the damper 600 is as shown in FIG. 7 through any amount between these two extremes by rotating the extending portions 615 such that the outer 616 and inner 618 sheet members are orientated in intermediate positions.

Although FIGS. 6 and 7 show the damper 600 in its two extreme positions, it should of course be understood that the position of the damper is variable according to the input from the shafts 614, so that intermediate positions could be adopted, thereby allowing some of the hot gas 810 to pass through the bypass duct (not shown) and some through the heat exchanger duct (not shown).

Figure 9:
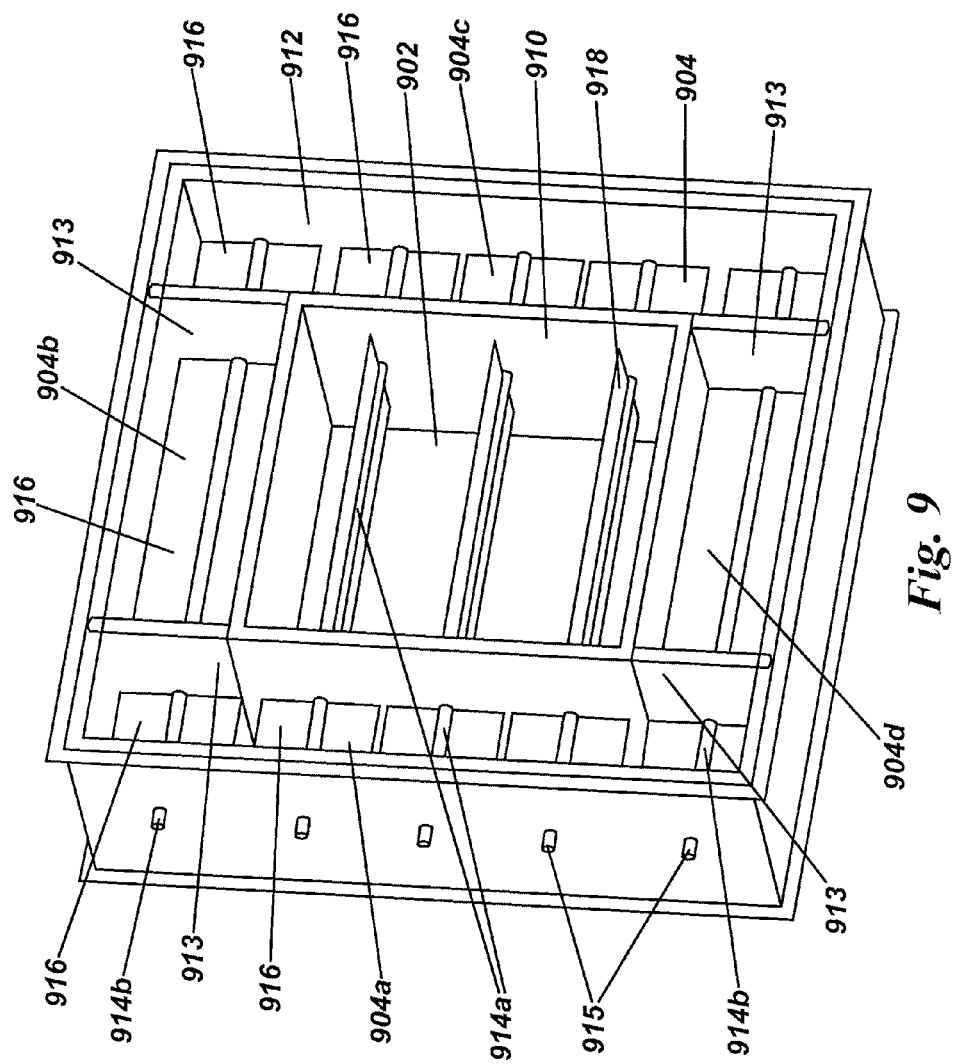
FIG. 9 shows an alternative louver damper arrangement in a heat exchange position (which may be termed an open to coil position)
Figure 10:
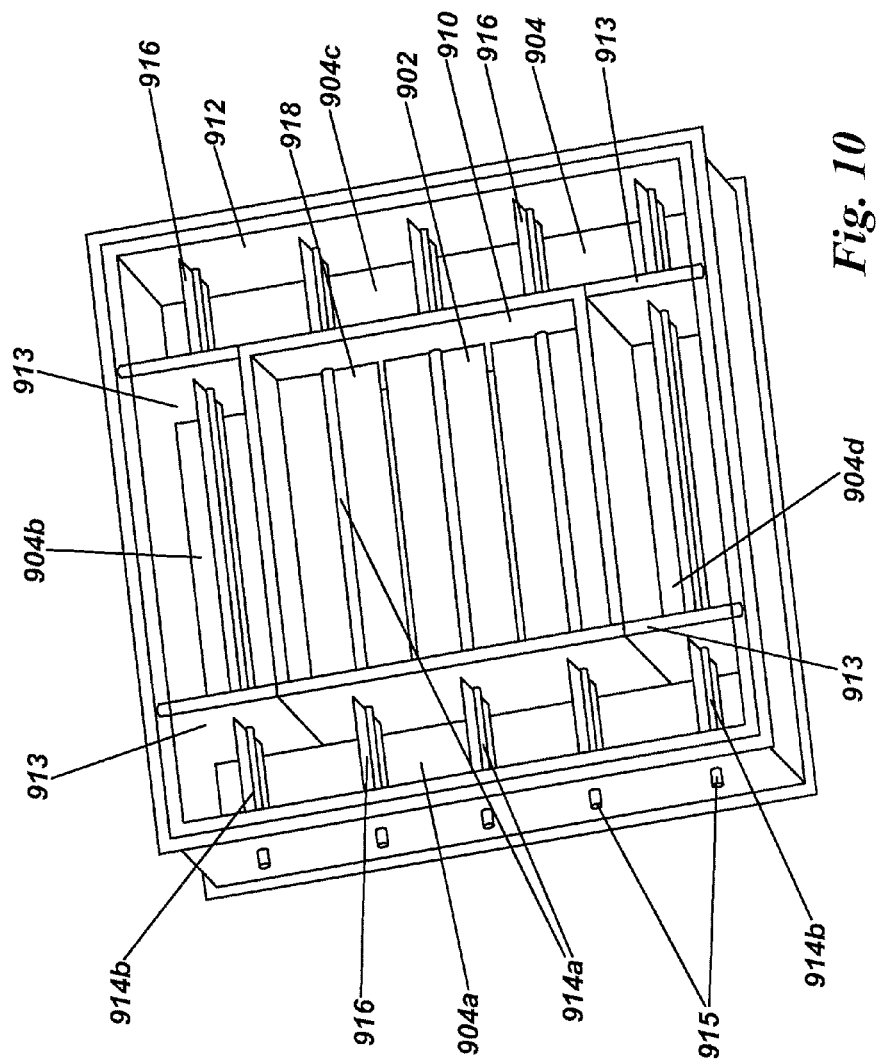
FIG. 10 shows an alternative louver damper arrangement in a heat exchange position (which may be termed an open to coil position)

Referring now to FIGS. 9 and 10 a damper 900 is shown which is similar in operation and principal to damper 600. The purpose of FIGS. 9 and 10 is to show how the louver principal may be extended to dampers with non-circular cross-sections. In this case a square cross section.

The damper 900 has inner 902 and outer 904 ducts, the inner 902 being surrounded by the outer 904. The inner 902 and outer 904 ducts align with the heat exchange duct (not shown) and the bypass duct (not shown) respectively of a heat exchanger having a square intake. This embodiment does not have a baffle at the centre of the inner duct 902, but this could easily be incorporated. The inner duct 902 is defined as the area within an inner duct wall 910. The outer duct 904 is defined between the inner duct wall 910 and an outer duct wall 912. Four additional structural walls 913 are also provided, required to secure the inner duct wall 910. These structural walls 913 divide up four portions of the outer intake duct 904a, 904b, 904c and 904d.

A plurality of shafts 914a are provided that extend through the damper 900, passing through the outer duct wall 912, through the outer duct 904, through the inner duct wall 910, through the inner duct 902, through the inner duct wall 910, through the outer duct 904 and through the outer duct wall 912. Additionally a plurality of shafts 914b are provided that extend through the damper 900, passing through the outer duct wall 912, through the outer duct 904 (including through two of the structural walls 913) and through the outer duct wall 912. The shafts 614 are provided at regular intervals through the damper 900. Suitable openings (not shown) are provided for the passage of the shafts 914a and 914b in the inner duct wall 910, outer duct wall 912 and structural walls 913. The openings (not shown) are also suitable for receiving and retaining a bearing (not shown) such as a glacier bearing. The bearings (not shown) mean that the shafts 914 may be rotated about their longitudinal axes. An extending portion 915 of each of the shafts 914a and 914b extends longitudinally outwards beyond the outer duct wall 912. The extending portion 915 is attached to an actuation mechanism (not shown), such as a lever for rotating substantially simultaneously all of the shafts 914a and 914b. However, any suitable mechanism may be employed, such as a gear provided on an end region of the shaft, etc.

Attached, perhaps by welding, to each shaft 914a are three sheet members of stainless steel, two housed in the outer duct 904 (outer sheet members 916) and the other housed in the inner duct 902 (inner sheet member 918). Attached, perhaps by welding, to each shaft 914b are three sheet members of stainless steel, each housed in the outer duct 904 (outer sheet members 916) but separated by structural walls 913. The set of sheet members in each duct 902, 904 produces a louver arrangement. All outer sheet members 916 are orientated substantially parallel to one another and all inner sheet members 918 are orientated substantially parallel to one another. Outer sheet members 916 and inner sheet members 918 are however orientated substantially perpendicular to one another. As shown in FIG. 8, the outer sheet members 916 are shaped such that when the shafts 914a and 914b are rotated so as the outer sheet members 916 in the outer duct 904 present their large surfaces to a fluid entering the outer duct 904, the outer sheet members 916 cooperate to produce a substantially continuous surface. As shown in FIG. 9, the inner sheet members 918 are shaped such that when the shafts 914a are rotated so as the inner sheet members 918 in the inner duct 902 present their large surfaces to a fluid entering the inner duct 902, the inner sheet members 918 cooperate to produce a substantially continuous surface. Although not shown here, in other embodiments the sheet members are provided with perimetrical ledges at their edges. The ledges are welded onto the strip and are shaped so as to create a seal between neighbouring sheet members and between each sheet member and the inner duct wall 910, outer duct wall 912 and the structural walls 913 as appropriate. Additionally the ledges may be provided with a sealant having high elasticity at the operating temperatures of the damper 900 (such as Inconel 625 or Hastoloy).

Figure 11:
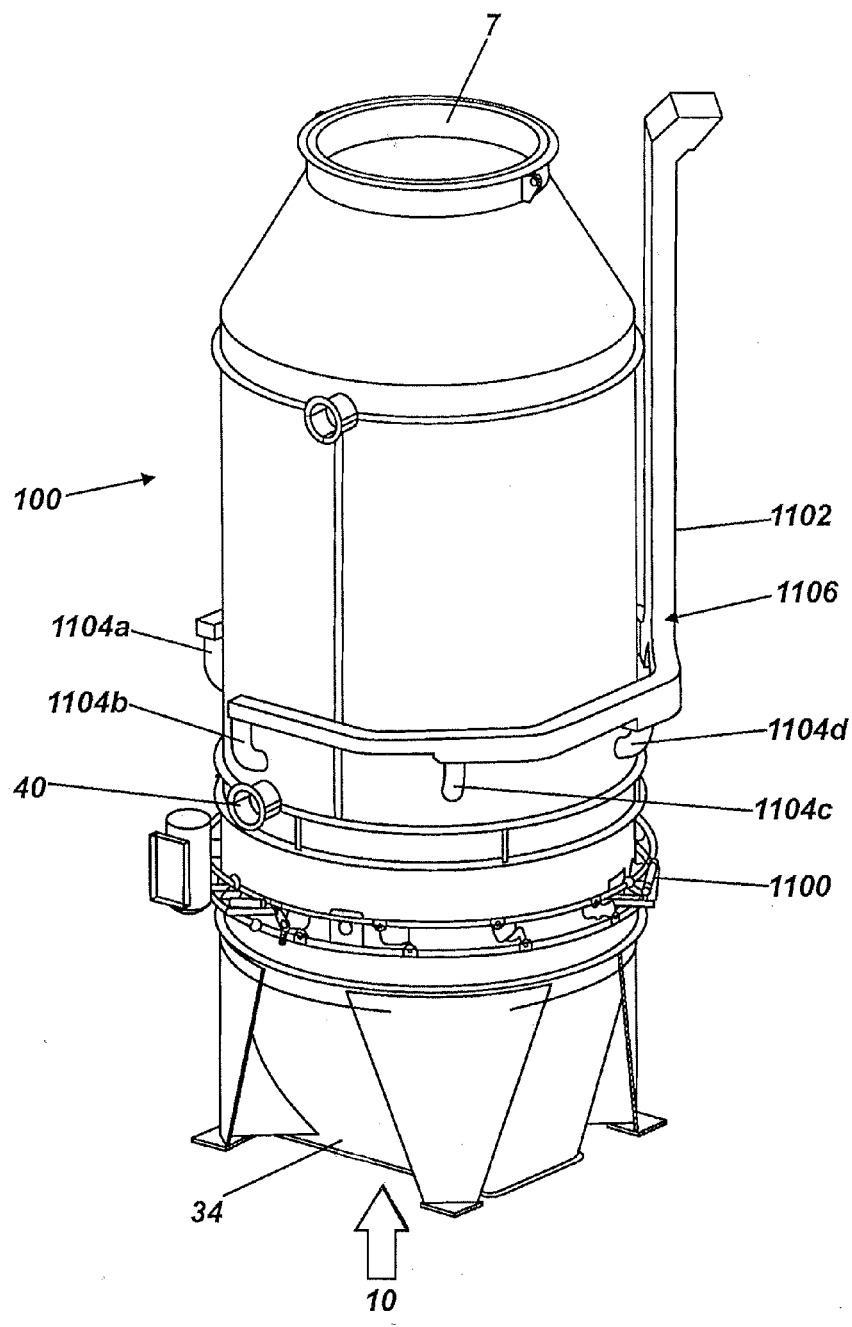
FIG. 11 shows a further embodiment of the invention.
Figure 12:
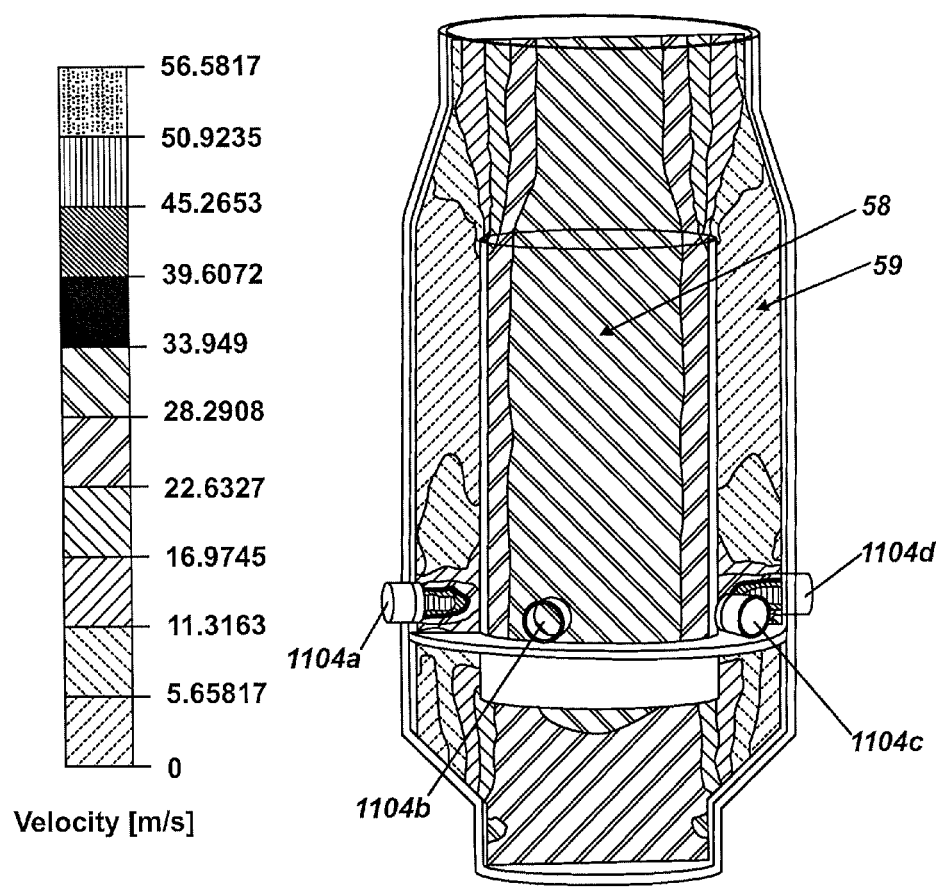
FIGS. 12 and 13 show details of the rate of fluid flow through the embodiment of FIG. 11.
Figure 13:
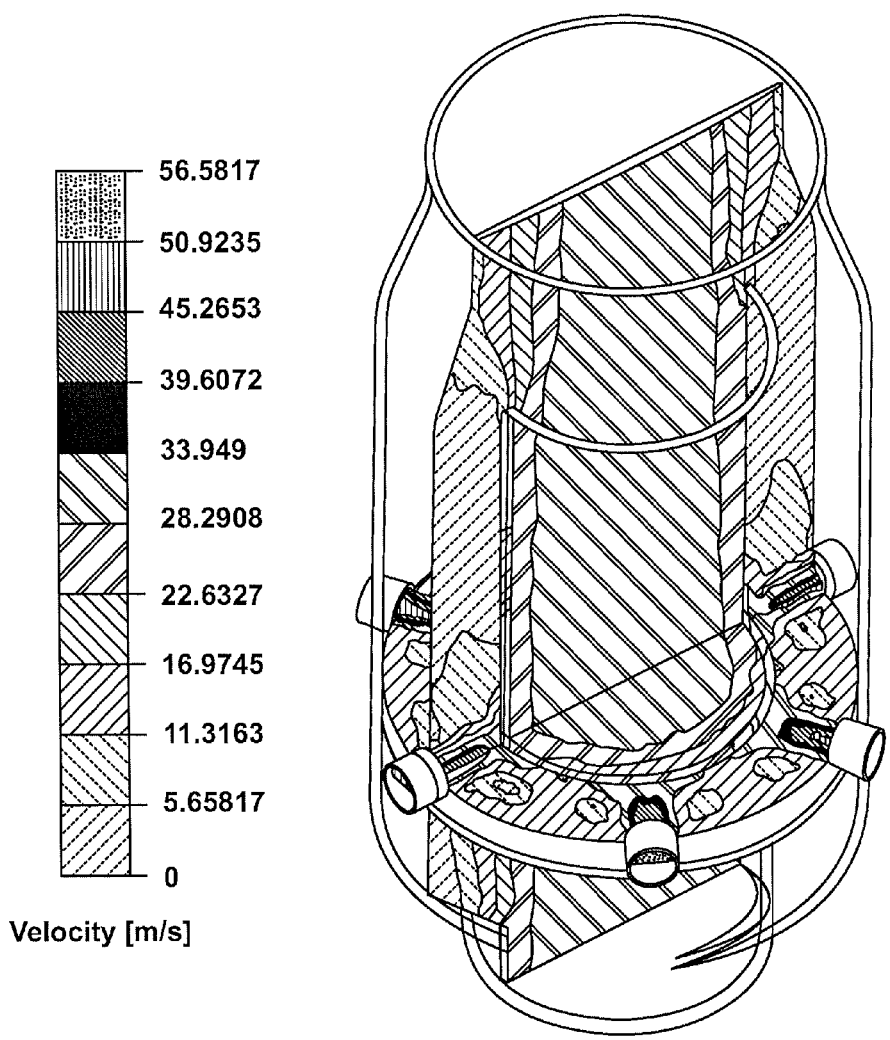

FIGS. 11 to 13 describe a further embodiment of the invention and again, like parts are referred to with like reference numbers.

A heat exchange unit 100 is shown with an inlet duct 34 into which hot gas 10 enters. Gas that has passed through the heat exchange unit 100 exits through the gas exit duct 7. The outlet pipe 40 from the heat exchange array (not seen in Figure) is shown as is a mechanism 1100 arranged to control a damper which may be as described in relation to any of the preceding Figures.

Additionally, a conduit 1102 which supplies, in this embodiment, six intakes 1104 (four of which can be seen in the figures and are labelled 1104 *a* to *d*) equispaced around the perimeter of the unit 100.

In the embodiment being described the unit 100 is arranged in a manner which is configured in an opposite manner to that shown in FIG. 1, having a bypass duct 58 in a central region which is surrounded by a heat exchange duct 59. These are highlighted in FIG. 12 which shows a cross section through the embodiment of FIG. 11.

The heat exchange duct has positioned therein a heat exchange array 2. A damper is provided within the unit which can selectively close the heat exchange duct or the bypass duct and is controlled by the mechanism 1100 which is seen around the outside of the unit 100 in FIG. 11.

Each of the intakes 1104 extends into the heat exchange duct. A flow control mechanism 1106 is positioned within the conduit 1102 such that the conduit can be selectively closed or opened.

The arrangement is such that when the unit 100 is operated with the heat exchange duct fully closed by the damper (and therefore with substantially 100% of the hot gas 10 flowing through the bypass duct through a central region of the unit) the flow control mechanism 1106 is opened thereby allowing air to pass through the conduit 1102. Thus (and referring to FIG. 12) hot air passing through the bypass duct 58 passes the exit of the heat exchange duct 59 and thereby creates a negative pressure in the heat exchange duct 59 by the Venturi effect.

Since the fluid control mechanism 1106 is open air is drawn through the conduit 1102 via the intakes 1104 into the heat exchange duct 1104. This provides a cooling fluid passing through the heat exchange array 2 that may be used to remove excess heat whilst in this bypass condition (ie with substantially all hot gas passing through the bypass). The flow of this fluid can be seen in FIGS. 12 and 13 which provide a model of the air flow and it can be seen that operating in this manner a flow of between 6 m/s and 11.5 m/s is induced within the heat exchange duct 59. Within the intakes 1104 a flow rate of up to 56 m/s is induced.

Such a bypass condition may exist when for example there is a problem with the cooling fluid passing through the heat exchange array. As such, the heat exchange condition may exist as an emergency condition (for example cooling pumps circulating cooling fluid through the heat exchange array may fail whilst the supply of hot gas 1 is maintained—eg turbine still operates). It is conceivable that in such a condition, heat can build up in the heat exchange unit that is roughly in the range 1% to 4% of the heat in the exhaust heat. Such a heat build up may lead to boiling of the fluid within the heat exchange unit which the skilled person will appreciate should be avoided. Thus, air drawn through the intakes 1104 may provide a means to cool the heat exchange array 2 whilst it is being bypassed by the hot gas.

There are other ways of arranging the internals of the heat exchanger apart from those shown in FIGS. 1 to 13 above which could be developed within the scope of this invention.

The casing 1, heat exchanger duct and annular fluid passage 58 are generally cylindrical, however, shapes having a non-circular cross section are also functional.

The heat exchanger may also be configured to operate with the exhaust gas flowing in the opposite direction to that shown in the figures with only relatively minor modifications to the internals.

The heat exchanger is most suited to operation in a vertical arrangement as shown in all figures, however, it may also be operated in any other position, including horizontal and upside down, again with relatively minor modifications to the internals.

The damper may be actuated and guided by alternative means to those described above and as shown in the Figures, again within the scope of this invention.

The damper may form a frusto-conical shape in it's open position rather than a cylindrical shape.

The damper may be alternatively designed to that described above, whereby the damper is made up of a plurality of segments, instead of one corrugated piece. For example three segments could be used beneficial, however any number may be used, with each being attached to an actuator, with the damper operating in a similar way to a clam shell. In this design the segments may require a seal on their long edges, which may be achieved using tubes between the baffle and the heat exchange casing for sealing on bypass, and tubes between the heat exchange casing and the outer casing for sealing when the damper is open to the heat exchange array. The tubes with holes along the length of the sealing face may be used to provide 100% seal using pressurised air in the tubes.

The induction system described in relation to FIGS. 11 to 13 may be used in association with any of the embodiments shown in FIGS. 1 to 10. Likewise, any of the damper and damper control mechanisms described in relation to FIGS. 1 to 10 may be used in relation to FIGS. 11 to 13.

The invention claimed is:

1. A heat exchange unit for hot gas recovery comprising, an inlet duct to which a heat exchange duct and a bypass duct are connected, one being surrounded by the other, a heat exchange array situated within the heat exchange duct, a central core around which the inner of the bypass and heat exchange ducts is provided, and a damper arranged to direct the flow of gas through the unit, wherein the damper comprises a plurality of sheet members, with a first subset of sheet members extending across at least one of the bypass duct and the heat exchange duct and a second subset of sheet members extending across the other of the bypass duct and the heat exchange duct, such that the damper is situated within the inlet duct and can be rotated, such that in a first position the first subset of sheet members of the damper provides a first continuous surface and substantially seals one of the heat exchange and bypass ducts from the inlet duct and in a second position the second subset of sheet members of the damper provides a second continuous surface and substantially seals the other of the ducts from the inlet duct, wherein the damper comprises a plurality of shafts, each shaft supporting at least one sheet member, wherein each shaft supports at least one sheet member in the heat exchanger duct and at least one sheet member in the bypass duct.

2. A unit according to claim 1 in which the damper comprises a damper surface.

3. A unit according to claim 2 in which the damper surface is provided by the sheet members.

4. A unit according to claim 3 in which some or all sheet members are corrugated or have one or more ledges at edge regions thereof.

5. A unit according to claim 4 in which each corrugation or ledge is radiussed.

6. A unit according to claim 1 in which the central core is arranged to provide a valve seat against which the damper seals when in the first position.

7. A unit according to claim 1 in which an outer casing of the unit provides a valve seat against which the damper seals when in the second position.

8. A unit according to claim 7 in which the outer casing comprises a step which provides the valve seat.

9. A unit according to claim 1 in which the inner of the ducts provides the heat exchange duct and the outer of the ducts provides the bypass duct.

10. A unit according to any of claim 1 in which the inner of the ducts provides the bypass duct and the outer of the ducts provides the heat exchange duct.

11. A unit according to claim 1 in which at least one of the heat exchange and the bypass ducts is annular in shape.

12. A unit according to claim 1 in which the heat exchange duct and the bypass duct are selectively closable, and at least one of the ducts has one or more fluid intakes therein to each of which is arranged such that when one of the heat exchange duct or the bypass duct is substantially closed and fluid flows through the other of the ducts, fluid is drawn through the one or more intakes and into the substantially closed duct.

13. A unit according to claim 1 wherein the damper is arranged to provide a fluid impermeable barrier which moves from a continuous surface in one duct when in the first position to a continuous surface in the other duct when in the second position.

14. A unit according to claim 12 in which it is the heat exchange duct that has the or each intake positioned therein.

15. A unit according to claim 12 in which the or each intake is connected via a conduit to a supply of cooling fluid.

16. A unit according to claim 12 in which the or each intake is arranged such that fluid is drawn through them by a negative pressure created within the duct into which the or each intake is connected.

17. A unit according to claim 12 in which the heat exchange and bypass ducts are arranged such that fluid passing through one creates a negative pressure in the other.

18. A unit according to claim 1 wherein an end region of the central core provides a baffle upon which fluid, entering the unit, impinges.

19. A unit according to claim 1 wherein the shafts extend radially through the damper.

20. A unit according to claim 1 wherein at least one sheet member in the heat exchange duct is substantially perpendicular to at least one sheet member in the bypass duct.

21. A unit according to claim 1 wherein the sheet members are arranged in a louver.

22. A unit according to claim 1 in which the sheet members of the damper are oriented substantially parallel to the direction of fluid flow in the non-sealed duct when in the first or second position.

23. A unit according to claim 1 in which a sheet member of the first subset is paired with a sheet member of the second subset with one sheet member of each pair located in the heat exchange duct and the other sheet member of each pair located in the bypass duct.

* * * * *